United States Patent Office 2,802,740
Patented Aug. 13, 1957

2,802,740
FRIEDCAKE MIX CONTAINING WATER-SOLUBLE CELLULOSE ETHERS

Miles A. Weaver, Ithaca, and Kenneth D. Bacon and George K. Greminger, Jr., Midland, Mich., assignors to The Dow Chemical Company, Midland, Mich., a corporation of Delaware No Drawing. Application September 21, 1953,
Serial No. 381,492

6 Claims. (Cl. 99—94)

This invention relates to an improved mix or batter for making crullers or friedcakes, in which the use of eggs is sharply curtailed or completely eliminated.

The usual mix for making friedcakes contains flour, sugar, shortening, salt, baking powder or soda, milk, eggs and flavoring. Commerically prepared dry mixes are available in which dry milk solids and dried eggs are used, and such mixes need only the addition of water to make the batter which is to be shaped or fried in deep fat. The commercial bakers and friedcake manufacturers are aware of the fact that the most expensive item in such a batter is the egg content, and of the fact that many people who might otherwise be consumers of friedcakes cannot eat them because of their egg content for dietary reasons. These and other potential consumers may also be deterred from eating the conventional friedcakes because of the large amount of grease absorbed by the usual batter during frying. For these reasons, it is desired to formulate a friedcake batter in which the amount of egg can be reduced significantly below normal levels, or wholly eliminated, and which absorbs much less than the normal amount of grease when fried in deep fat. The attainment of these desired ends constitutes the principal object of this invention.

It has now been found that eggs may be omitted from friedcake batter, and that an improved product is obtained, when there is substituted for the eggs from 0.02 to 0.2 ounce of one of a particular class of water-soluble cellulose ethers for each quart of the fluid constituents of the batter. The cellulose ethers which have been found useful are methyl cellulose, hydroxypropyl methyl cellulose and carboxymethyl hydroxyethyl cellulose. Of these, the non-ionic methyl cellulose is preferred, since its use gives certain desirable qualities to the friedcakes that cannot be obtained with the usual egg-containing batters.

In the following examples, which illustrate the invention, all of the tested batters were variations of the same basic mix with the indicated kinds and amounts of other ingredients substituted for all or part of the eggs of the original recipe. Among the factors used in evaluating each batter are:

(1) Outside appearance of the friedcakes. A smooth surface and uniform color are desired.

(2) Size of the friedcakes. Uniformity of size, without significant variation due to drying, is desired.

(3) Inside texture. Uniform small pores and evidence of being cooked throughout are desired.

(4) Grease holdout. Minimum absorption of grease during frying is desired. It is preferred that a grease-repellant seal be formed when the batter is dropped into the hot fat.

(5) Taste. Such factors as crispness and freedom from greasiness are considered, and the palatability of the product is arbitrarily rated as poor, fair, good or excellent.

Apart from the substitution of a cellulose ether for the eggs in the basic recipe, the only change was in the amount of milk, which was varied as needed to give the batter the required consistency for use in an automatic "doughnut machine." Had the basic recipe been one based on dried eggs and dry milk solids, there would have been a comparable change in the amount of water needed to give the desired consistency in the batter.

The basic recipe used in the tests reported below consisted essentially of:

Flour, sifted _____ pounds __ 24
Shortening, melted _____ do ____ 1
Sugar _____ do ____ 8
Baking powder _____ oz __ 8
Liquid whole eggs _____ fl. oz __ 32
Liquid whole milk _____ fl. oz __ 128
Salt and spices, to taste

EXAMPLE 1

For the 32 fluid ounces of whole eggs there was substituted ½ ounce, dry weight, of powdered methyl cellulose of a type whose 2 percent solution in water at 20° C. has a viscosity of 100 centipoises. There was required 144 ounces of milk to give the right consistency to the batter. Evaluation of this batch appears in the table following Example 7.

EXAMPLE 2

Water-soluble carboxymethyl hydroxyethyl cellulose was used, in amount of ½ ounce, to replace the eggs of the basic recipe.

EXAMPLE 3

Water-soluble sodium salt of carboxymethyl cellulose was used, in amount of ½ ounce, to replace the eggs in the basic recipe.

EXAMPLE 4

One-half ounce of carboxymethyl methyl cellulose was used to replace the eggs in the basic recipe.

EXAMPLE 5

The eggs of the basic recipe were replaced with ½ ounce of a hydroxypropyl methyl cellulose whose 2 percent solution in water at 20° C. has a viscosity of 50 centipoises.

EXAMPLE 6

Eggs were omitted from the basic recipe, but were not replaced by any cellulose ether.

EXAMPLE 7

The basic recipe was used unchanged. Friedcakes were made from each mix in the same machine, with the cooking oil always at the same temperature and with the friedcakes advancing through the machine at the same rate to equalize cooking conditions. The several observations regarding each batch of friedcakes appear in the following table.

Table 1

| Example No. | External Appearance | Size | Inside Texture | Taste | Grease Holdout |
|---|---|---|---|---|---|
| 1 | Smooth and even color | Good | Very good | Excellent | Very good. |
| 2 | ____do____ | ____do____ | Good | Good | Fair. |
| 3 | Very rough | Very poor | Very poor | Poor | Poor. |
| 4 | ____do____ | ____do____ | ____do____ | ____do____ | Do. |
| 5 | Smooth and even color | Good | Good | Good | Fair. |
| 6 | Rough | Poor | Very poor | Poor | Poor. |
| 7 | Fairly smooth and even color | Good | Very good | Excellent | Fair. |

On every count, the methyl cellulose batch was as good or better than the basic recipe. The batches with carboxymethyl hydroxypropyl cellulose and with hydroxypropyl methyl cellulose were equal to or better than the basic recipe in the matter of external appearance, size, and grease holdout, but were not quite as good in the inside texture and taste of their friedcakes. The batches made with carboxymethyl cellulose and with carboxymethyl methyl cellulose were inferior in every test, being comparable with the batch which contained neither eggs nor a cellulose ether.

The amount of methyl cellulose (or other useful cellulose ether) to be employed depends largely on two factors. Thus, if some eggs are to be used, less methyl cellulose is required than when the recipe is to be eggless. Also, the lower the viscosity type of the methyl cellulose, the greater is the amount required to give the batter the desired consistency, always using the same amount of milk or water. Amounts of from 0.02 to 0.2 ounce of water-soluble cellulose ether (dry weight basis) per quart of fluid have been found satisfactory. The effect of the viscosity type of the methyl cellulose used on the amount of fluid required in one particular recipe is shown in the following Table 2. Viscosity type of the cellulose ether refers to the viscosity of a 2 percent solution of that ether, by weight, in water at 20° C.

Table 2

| Amount of Methyl Cellulose, Ounces, Dry Weight | Viscosity Type, Centipoises | Amount of Liquid Eggs, Fluid Ounces | Whole Milk Required, Fluid Ounces |
| --- | --- | --- | --- |
| None (Basic Recipe) | | 32 | 32 |
| 1/8 | 15 | | 48 |
| 1/8 | 15 | 4 | 36 |
| 1/8 | 100 | | 56 |
| 1/8 | 4,000 | | 64 |
| 1/24 | 4,000 | | 48 |
| 1/20 | 100 | | 48 |
| 1/20 | 15 | | 36 |

Because of the wide variation among the recipes used for making friedcake mixes, it is not possible to express the amount of cellulose ether as a specific fraction of the weight of dry constituents. In general, the amount of the cellulose ether which can be substituted for all or a major part of the normal egg content of such a mix, to yield a highly satisfactory friedcake, may be expressed as being from 0.02 to 0.2 ounce, dry weight, for each U. S. quart (32 fluid ounces) of liquid ingredients. Only three of the water-soluble cellulose ethers have been found to be satisfactory, and methyl cellulose is the best of these.

We claim:

1. In the manufacture of friedcakes, the improvement which consists in substituting for at least half of the normal egg content of the mix an amount, from 0.02 to 0.2 ounce, dry weight, for each 32 fluid ounces of liquid ingredients, of a water-soluble cellulose ether selected from the group consisting of methyl cellulose, hydroxypropyl methyl cellulose and carboxymethyl hydroxyethyl cellulose.

2. The improvement claimed in claim 1, wherein the cellulose ether is substituted for all of the eggs in the mixture.

3. The improvement claimed in claim 1, wherein the cellulose ether is methyl cellulose.

4. A mixture of normal ingredients in normal proportions for making friedcakes except that at least half of the normal egg content is replaced by a water-soluble cellulose ether from the group consisting of methyl cellulose, hydroxypropyl methyl cellulose and carboxymethyl hydroxyethyl cellulose, in amount from 0.02 to 0.2 ounce, dry weight, for each 32 fluid ounces of the liquid ingredients required to give the normal consistency to the batter.

5. The mixture claimed in claim 4, wherein the cellulose ether is substituted for all of the eggs in the mixture.

6. The mixture claimed in claim 4, wherein the cellulose ether is methyl cellulose.

References Cited in the file of this patent

UNITED STATES PATENTS

| | | |
| --- | --- | --- |
| 1,495,789 | Hamor | May 27, 1924 |
| 1,943,374 | Dreyfus | Jan. 16, 1934 |
| 2,302,511 | Wallach | Nov. 17, 1942 |
| 2,664,422 | Downing | Dec. 29, 1953 |

FOREIGN PATENTS

| | | |
| --- | --- | --- |
| 592,011 | Great Britain | Sept. 4, 1947 |
| 684,561 | Great Britain | Dec. 17, 1952 |

OTHER REFERENCES

"Experimental Cookery," by B. Lowe, 1937, published by John Wiley & Sons, Inc. (New York), pp. 273 and 488.

Morrison et al.: Jour. Sci. Chem. Ind., "Water-soluble cellulose ethers as emulsifying agents," December 1949, pp. 333 to 336.